United States Patent [19]

Isnardi

[11] Patent Number: 5,122,868
[45] Date of Patent: Jun. 16, 1992

[54] SIDE PANEL SIGNAL PROCESSOR FOR A WIDESCREEN TELEVISION SYSTEM

[75] Inventor: Michael A. Isnardi, Plainsboro, N.J.

[73] Assignee: General Electric Company, Princeton, N.J.

[21] Appl. No.: 599,554

[22] Filed: Oct. 18, 1990

[51] Int. Cl.⁵ .......................................... H04N 11/00
[52] U.S. Cl. ........................................ 358/36; 358/12
[58] Field of Search .................................. 358/12, 36

[56] References Cited

U.S. PATENT DOCUMENTS

| | | | |
|---|---|---|---|
| 4,179,710 | 12/1979 | Ishiguro et al. | 358/135 |
| 4,255,763 | 3/1981 | Maxemchuk | 358/135 |
| 4,575,749 | 3/1986 | Acampora et al. | 358/27 |
| 4,855,811 | 8/1989 | Isnardi | 358/12 |
| 4,992,873 | 2/1991 | Koslov et al. | 358/12 |
| 5,005,082 | 4/1991 | Zdepski et al. | 358/174 |

FOREIGN PATENT DOCUMENTS 2203012A 10/1988 United Kingdom.
9107063 5/1991 World Int. Prop. O..

Primary Examiner—John W. Shepperd
Attorney, Agent, or Firm—Joseph S. Tripoli; Eric P. Herrmann; Ronald H. Kurdyla

[57] ABSTRACT

In a widescreen television signal processing system, a side panel high frequency luminance information component and a side panel color difference information component are combined and processed as a combined signal by a noise reduction encoder, time expander and filter before modulating an auxiliary subcarrier. After demodulation at the decoder, the combined signal is filtered, time compressed and processed by a noise reduction unit before being separated into its constituent components.

13 Claims, 5 Drawing Sheets

SIDE PANEL SIGNAL PROCESSOR FOR A WIDESCREEN TELEVISION SYSTEM

FIELD OF THE INVENTION

This invention concerns apparatus for processing the side panel information component of a widescreen television signal containing main and side panel components.

BACKGROUND OF THE INVENTION

A conventional television system, such as a system in accordance with the NTSC broadcast standard adopted in the United States and elsewhere, processes a television signal representative of an image with a 4:3 aspect ratio (the ratio of the width to the height of a displayed image). Recently, there has been interest in using higher aspect ratio images for television systems, such as 5:3, 16:9 and 2:1, since such higher aspect ratios more nearly approximate or equal the aspect ratio of the human eye compared to the 4:3 aspect ratio of a standard television display. Advanced television systems for producing 5:3 aspect ratio images are described, for example, in U.S. Pat. No. 4,816,899—Strolle, et al. and in U.S. Pat. No. 4,855,811—Isnardi. In these systems side panel image information is encoded by time compressing low frequency side panel luminance and chrominance information into horizontal overscan regions, and high frequency side panel luminance and chrominance information are encoded by time expansion and modulation of an auxiliary subcarrier. The side panel luminance information component (Y) and the side panel chrominance color difference information components (I and Q) are each processed separately before being encoded.

Separate processing of the side panel luminance component, the side panel "I" color difference component and the side panel "Q" color difference component advantageously permits each component to be uniquely tailored with respect to one or more desired factors such as noise reduction, gain, or filter characteristics for example. Illustratively, in the case of a widescreen television signal which is intended to be compatible with a standard NTSC receiver, gain factors could be individually adjusted to assure that side panel information encoded in a broadcast NTSC compatible signal will not produce visible interference in a standard receiver display. Also, the type of noise reduction system employed could be optimized based upon the characteristic of the particular component, e.g., based upon whether or not a given component contains DC information.

It is herein recognized, however, that it can be beneficial to process certain side panel components together as a combined signal before encoding, particularly in a system employing complementary noise reduction apparatus at the transmitter encoder and receiver decoder. Specifically, it is recognized herein that bandwidth restrictions on certain components such as side panel components can lead to unwanted band-edge crosstalk between such components. That is, bandwidth limitations may not permit practical filters from keeping the components sufficiently separated at their band edges to prevent significant crosstalk. This crosstalk can significantly impair the effectiveness of the encoder/decoder noise reduction apparatus, which to be most effective requires that the signal processed by the decoder noise reduction apparatus be essentially the same signal processed by the encoder noise reduction apparatus, except for transmission noise which the noise reduction apparatus is intended to reduce. It is also recognized herein that non-linearities generated by non-linear noise reduction apparatus can create harmonics which can adversely affect the quality of a reconstituted image signal when such components are processed in separate signal paths with separate noise reduction apparatus. The disclosed apparatus according to the principles of the present invention addresses these concerns. In addition to exhibiting a simplified configuration, the disclosed apparatus significantly reduces the impact of the described crosstalk and non-linearities in a reconstituted image signal.

SUMMARY OF THE INVENTION

In accordance with the principles of the present invention, first and second components of a widescreen video signal are combined at an encoder before being subjected to noise reduction and encoding processes. At a decoder, the combined signal is subjected to noise reduction processing before being separated into its constituent components and decoded. In an illustrated preferred embodiment of the invention, side panel high frequency luminance information and a side panel color difference information component are combined and processed as a combined signal by a noise reduction encoder, time expander and filter before modulating an auxiliary subcarrier. After demodulation at a decoder, the combined signal is filtered, time compressed and processed by a noise reduction unit before being separated into its constituent components.

DETAILED DESCRIPTION

Figure 1:
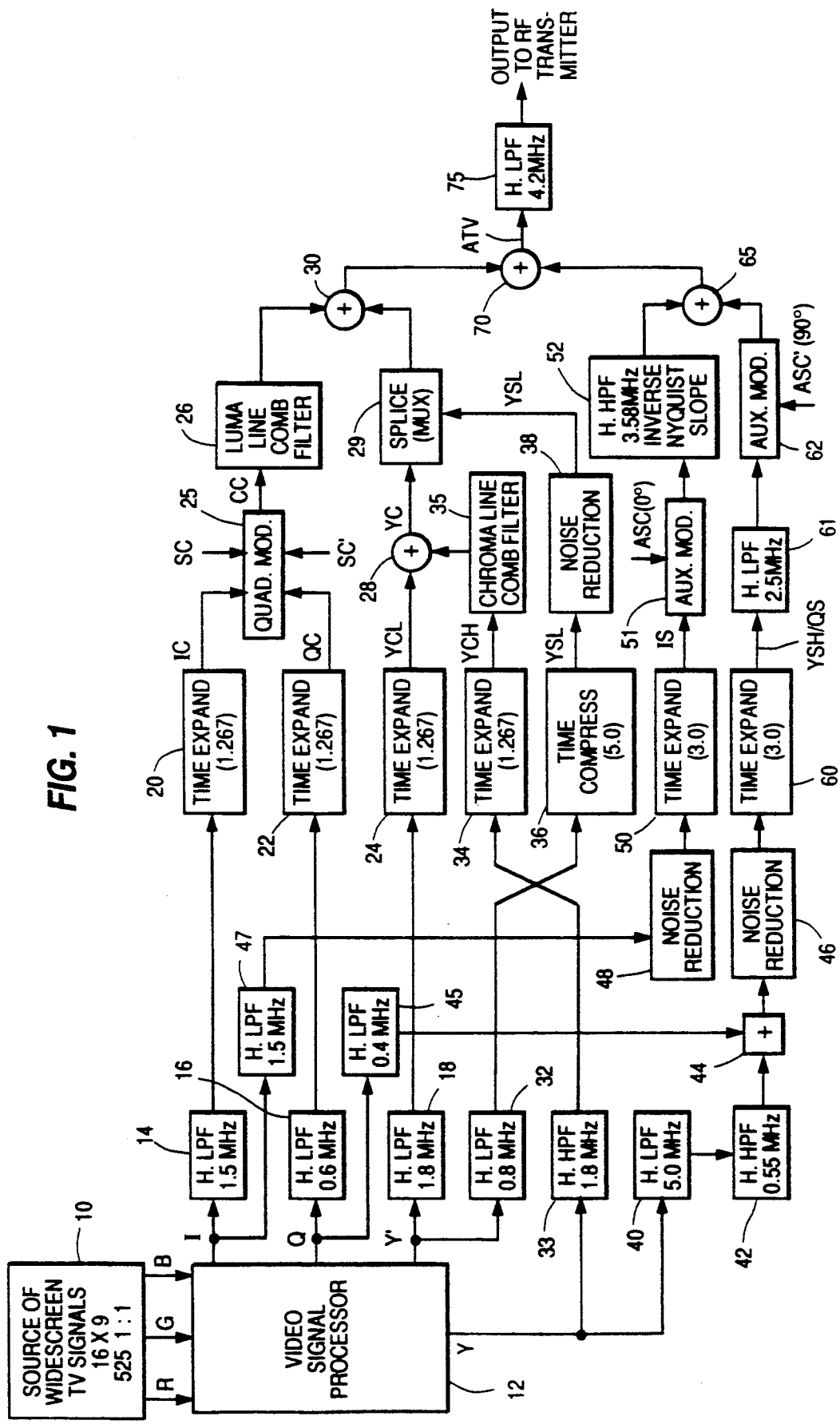
FIG. 1 shows a portion of an NTSC compatible widescreen transmitter/encoder including apparatus according to the present invention.

In the NTSC compatible widescreen transmitter/encoder of FIG. 1, a widescreen television signal source 10, such as a color television camera, provides a 16×9 wide aspect ratio 1:1 progressively scanned (non-interlaced) television signal with color components R, G and B. These signals are processed by a video signal processor 12 to provide luminance output signals Y, Y' and color difference output signals I and Q. Processor 12 includes circuits for translating the R, G, B input signals to I, Q, Y format, vertical-temporal filters for pre-filtering each of the I, Q, Y signals, and progressive scan to interlaced scan converters for each of the I, Q, Y signals. Output signals I, Q and Y from processor 12 are 262 line progressive scan signals. An output signal Y' is a 525 line interlaced luminance signal.

Encoding of the main (i.e., "center") panel information will be discussed first. Color difference signals I, Q and luminance signal Y' from unit 12 are respectively filtered by filters 14, 16 and 18 before being time expanded by units 20, 22 and 24, respectively. Units 20, 22 and 24 exhibit a time expansion factor of 1.267 and operate only on the center (main) panel portion of the I, Q, Y' signals from filters 14, 16 and 18. Thus time expanders 20 and 22 respectively provide output center panel color difference signals IC and QC. Time expander 24 provides an output luminance center panel low frequency signal YCL. Signals IC and QC quadrature modulate 3.58 MHz quadrature phased subcarriers SC and SC' in a modulator 25 to produce a modulated center panel chrominance signal CC. This signal is processed by a luminance line comb filter 26 to remove luminance information before being applied to a center panel chrominance input of an adder 30.

The center panel luminance signal input to adder 30 is developed as follows. The Y luminance signal from processor 12 is high pass filtered by a unit 33 and time expanded by a unit 34, which operates only during the center panel interval, to develop a center panel high frequency luminance signal YCH. This signal is processed by a chrominance line comb filter 35 to remove chrominance information before being combined with center panel low frequency luminance signal YCL in adder 28 to produce a center panel luminance signal YC.

Expanded center panel luminance signal YC is spliced to compressed side panel low frequency luminance information YSL by means of a multiplexer 29. Briefly, as discussed in detail in U.S. Pat. No. 4,855,811—Isnardi, signal YSL constitutes time compressed low frequency left and right side panel luminance information which is placed in left and right horizontal overscan regions of the center panel signal by means of multiplexer 29. Signal YSL is obtained by filtering signal Y' from processor 12 by means of a 0.8 MHz horizontal low pass filter 32, then selectively time compressing the side panel portions of the filtered signal by means of a compressor 36 which operates only during the side panel intervals. Signal YSL from compressor 36 is processed by a noise reduction unit 38 of the type shown in FIG. 5 for improving the signal-to-noise characteristic of signal YSL before being applied to splicer 29. The output of multiplexer/splicer 29 is applied to the luminance input of center panel signal combiner 30. Noise reduction unit 38, as well as noise reduction units 46 and 48, are amplitude compansion units having similar complementary counterpart units with inverse operating characteristics at a receiver.

High frequency side panel information is processed as follows. The "I" color difference component from processor 12 is filtered by a 1.5 MHz low pass filter 47 to produce a wideband I signal, and is processed by noise reduction unit 48. The output signal from unit 48 is time expanded during side panel intervals by a time expander 50 to produce wideband side panel color difference component IS. This signal is applied to an auxiliary modulator 51 for amplitude modulating an auxiliary subcarrier ASC with a nominal 0° phase. Subcarrier ASC exhibits a frequency of 3.58 MHz, the frequency of the standard chrominance subcarrier, but exhibits a phase which inverts from field-to-field unlike the standard chrominance subcarrier. Specifically, the phase of signal ASC inverts every 262 horizontal lines (262H).

The modulated signal from unit 51 is applied to a 3.58 MHz horizontal high pass filter 52 having an inverse Nyquist slope. Filter 52 mirrors a filter at a receiver having a Nyquist slope to achieve a desired amplitude response at a receiver demodulator. Specifically, the cascade of inverse Nyquist slope filter 52 at the encoder with a complementary Nyquist slope filter at a receiver decoder (as will be seen in FIG. 2) produces a desired flat amplitude response for high frequency side panel luminance signal YSH when demodulated at the receiver. Such cascade of Nyquist slope filters also assures that modulated auxiliary subcarrier ASC exhibits symmetrical double sideband IS information so that proper quadrature demodulation is achieved at the decoder, i.e., so that signal IS maintains a desired phase characteristic and does not crosstalk into components YSH or QS.

Side panel high frequency luminance information and side panel color difference component "Q" are combined for processing. The Q output signal from processor 12 is conveyed via a 0.4 MHz horizontal low pass filter 45 to a combiner 44, where it is combined with signal Y from unit 12 after filtering by a 5.0 MHz horizontal low pass filter 40 and a 0.55 MHz horizontal high pass filter 42. The output signal from combiner 44 is processed by noise reduction unit 46 and afterwards time expanded by a unit 60. Expander unit 60 operates during the side panel intervals for producing combined side panel highs signal YSH/QS, i.e., side panel high frequency luminance information combined with side panel Q color difference information. Because time expander 60 is not ideal, low energy repeat spectra are generated above 2.5 MHz. Low pass filter 61 removes these repeat spectra and prevents them from cross-talking into the main (center) panel component after modulation.

Combined signal YSH/QS is coupled via a 2.5 MHz horizontal low pass filter 61 to an auxiliary modulator 62, which modulates an auxiliary 3.58 MHz subcarrier ASC' with the output signal from filter 61. Subcarrier ASC' is in phase quadrature with subcarrier ASC and exhibits a similar phase inversion from field to field. The output signal from modulator 62 and the output signal from filter 52 are combined by an adder 65. An adder 70 combines the output signals from adders 30 and 65 to produce a compatible widescreen advanced television signal ATV. This signal is low pass filtered by a 4.2 MHz filter 75 to restrict signal ATV to the standard NTSC channel bandwidth before being applied to an RF transmitter for broadcast.

Figure 2:
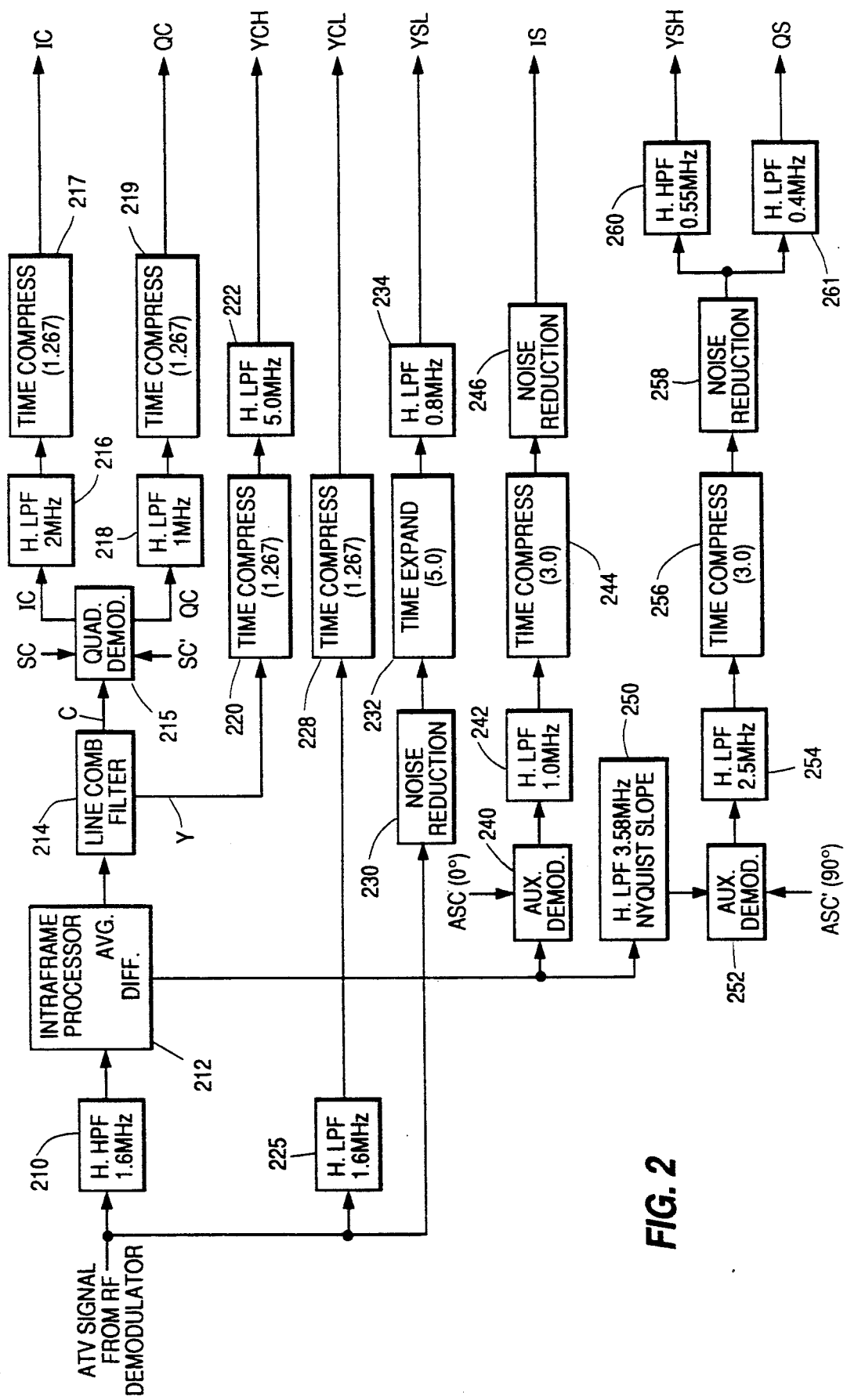
FIG. 2 shows a portion of an NTSC compatible widescreen receiver/decoder including apparatus according to the present invention.

FIG. 2 shows a portion of a widescreen television receiver including apparatus for decoding the widescreen ATV signal generated by the arrangement of FIG. 1. A received baseband encoded ATV signal (e.g., from an RF tuner and demodulator assembly not shown) is applied to a 1.6 MHz horizontal high pass filter 210, the output of which is applied to an intraframe processor 212. Processor 212 averages (additively combines) and differences (subtractively combines) image lines 262H apart within frames above 1.6 MHz to recover high frequency main panel signal information at an output AVG. Modulated side panel high frequency information is provided at a differencing output DIFF of processor 212.

The main panel component from the AVG output of processor 212 is filtered by a horizontal line comb filter 214 to provide separated luminance (Y) and chrominance (C) output components. The separated main panel luminance component is time compressed by a unit 220, which operates only during the main panel interval, to restore separated main panel component Y to its original spatial relationship. The time compressed signal from unit 220 is then filtered by a 5.0 MHz horizontal low pass filter 222 to develop main (center) panel luminance high frequency component YCH. The separated main panel chrominance information (C) is quadrature demodulated by a demodulator 215 responsive to quadrature phased reference signals SC and SC' having the frequency and phase characteristics of corresponding subcarrier signals provided at the encoder/transmitter. Demodulated center panel I and Q color difference components IC and QC are horizontally low pass filtered by filters 216 and 218 respectively before being time compressed by units 217 and 219. Time compression units 217 and 219 operate during the center panel intervals to restore the original spatial relationship of signals IC and QC.

The center panel low frequency luminance information is restored to its original form by means of filter 225 and time compressor 228. Horizontal low pass filter 225 passes frequencies of input signal ATV which are below about 1.6 MHz to time compressor 228, which operates during the center panel interval to restore low frequency center panel luminance information to its original spatial relationship, as signal YCL.

The input ATV signal is also applied to a noise reduction unit 230, which exhibits the complementary operating characteristics of unit 38 in the encoder of FIG. 1. A time expander 232 operates during the side panel intervals to restore the original spatial format of the side panel information which had been time compressed and placed in the horizontal overscan regions. The output signal from expander 232 is processed by a 0.8 MHz horizontal low pass filter 234 to provide low frequency side panel luminance signal YSL in its original spatial form.

To recover side panel I color difference component IS, the signal from the DIFF output of processor 212 is demodulated by an auxiliary demodulator 240 which responds to an auxiliary reference signal ASC having the same frequency and phase characteristics as subcarrier ASC developed at the encoder. The demodulated signal from unit 240 is filtered by a 1.0 MHz horizontal low pass filter 242, time compressed during side panel intervals by a unit 244 to restore the original spatial format of the signal component, and processed by a noise reduction unit 246 to produce side panel color I difference component IS. Noise reduction unit 246 and unit 46 at the encoder exhibit complementary operating characteristics.

To recover side panel components YSH and QS, the signal from the DIFF output of processor 212 is processed by a 3.58 MHz horizontal low pass Nyquist slope filter 250 before being demodulated by auxiliary demodulator 252. With regard to the use of Nyquist filter 250 it is noted that in this example component QS is a double sideband signal modulation component of auxiliary subcarrier ASC' occupying 3.38 MHz to 3.79 MHz, and component YSH is a (lower) single sideband modulation component of auxiliary subcarrier ASC' occupying 1.78 MHz to 3.25 MHz. Imparting a Nyquist slope to the higher energy double sideband region of the combined YSH/QS modulated signal (from 3.08 MHz to 4.08 MHz) reduces the effective energy of the double sideband region by one-half, so that a flat demodulation amplitude response results over the auxiliary subcarrier modulation frequencies. Demodulator 252 also responds to an auxiliary reference signal ASC' having the same frequency and phase characteristics as auxiliary subcarrier ASC' developed at the encoder. A demodulated output signal from demodulator 252 contains combined YSH and QS components and is filtered by a 2.5 MHz horizontal low pass filter 254.

The output signal from filter 254 is time compressed by a unit 256 which operates during side panel intervals to restore the original spatial relationship of the combined YSH/QS side panel information. The time compressed signal is then processed by a noise reduction unit 258, which exhibits the complementary operating characteristics of unit 46 in the encoder system of FIG. 1. The output signal from noise reduction unit 258 is separated into the YSH and QS components by means of a 0.55 MHz horizontal high pass filter 260, and a 0.4 MHz horizontal low pass filter 261, respectively.

The described processing of side panel components QS and YSH as a combined signal results in a less complicated system with improved performance. Fewer noise reduction modules, time compressor/expander units and modulators are needed. The hardware savings are especially significant in the case of a decoder in a consumer television receiver. Performance is improved because no intermediate band-edge filtering occurs between the noise reduction unit at the decoder. That is, there are no intermediate filters which would change the shape of the signal waveform applied to the decoder noise reduction network, causing the decoder noise reduction network to mistrack relative to the encoder noise reduction network. The 0.55 MHz lower cut-off frequency of signal YSH is determined by filter 42 in FIG. 1, and the 0.4 MHz upper cut-off frequency of signal QS is determined by filter 45 in FIG. 1. Furthermore, processing the QS and YSH components as a combined signal means that any crosstalk or harmonics associated with non-linear noise reduction operation at the encoder are more effectively cancelled at the decoder.

More specifically, the output of adder 44 contains signal QS in a low frequency band and signal YSH in a relatively higher frequency band, with frequency overlap in the region 0.3 MHz–0.65 MHz. When the output signal of adder 44 is passed through encoder noise reduction unit 46, the nonlinear transfer function of noise reduction unit 46 causes harmonics of signal QS to develop. These harmonics crosstalk into signal YSH. Because signal QS//YSH remains intact as a combined signal until after processing by a noise reduction unit at the decoder (i.e., unit 258 in FIG. 2), these crosstalk harmonics can be removed by the inverse nonlinear transfer function exhibited by the decoder noise reduction unit.

If signals YSH and QS were processed by separate noise reduction systems, harmonics generated by the QS encoder noise reduction unit would be filtered out by the QS lowpass filter at the decoder. The lost harmonics would cause mistracking in the QS decoder noise reduction unit, resulting in inferior performance. The QS harmonics, now residing in the YSH signal as crosstalk, compromise the performance of the YSH decoder noise reduction unit as well.

Figure 3:
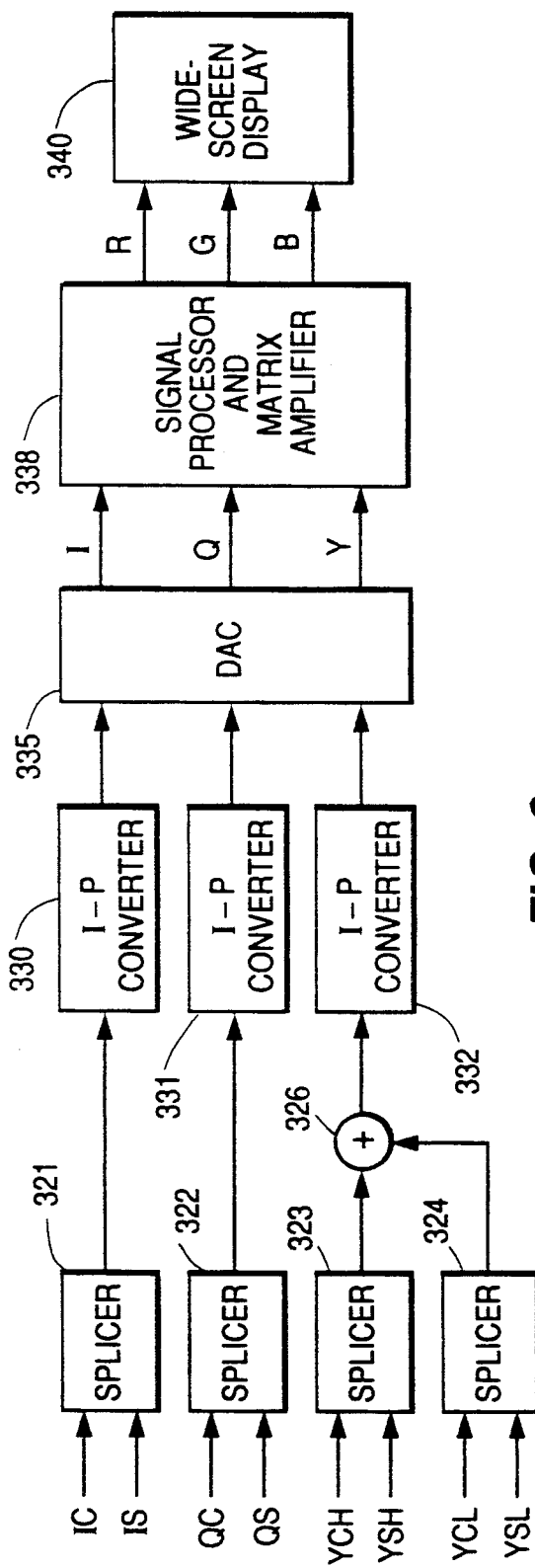
FIG. 3 shows an additional portion of the receiver/decoder of FIG. 2.

The output signals developed by the decoder apparatus of FIG. 2 are processed further as shown in FIG. 3. Signals IC and IS, QC and QS, YCH and YSH, and YCL and YSL are respectively spliced by splicers 321, 322, 323 and 324 respectively. Output signals from splicers 323 and 324 are combined by an adder 326 to provide a restored widescreen luminance signal with main panel and side panel information. The widescreen chrominance signals from splicers 321 and 322 and the widescreen luminance signal from adder 326 are converted from interlaced to progressive scan format by means of converters 330-332 before being converted to analog form via a digital-to-analog converter unit 335. Widescreen analog signals I, Q, Y are matrixed and processed by conventional video signal processing circuits in a network 338 to produce color image representative signals R, G and B suitable for display by a widescreen image reproducing device 340.

Figure 4:
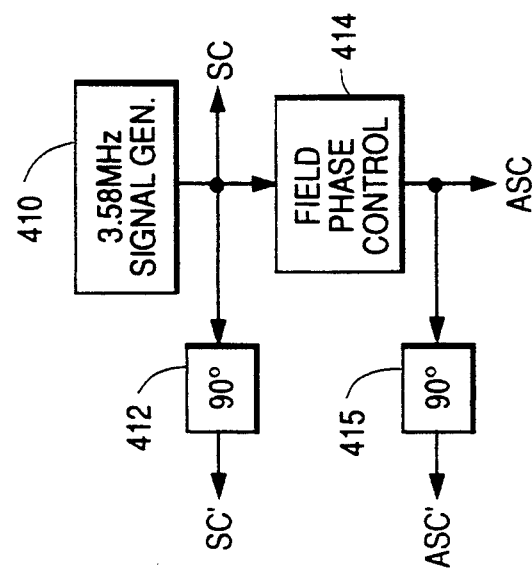
FIG. 4 shows additional details of the disclosed apparatus.

FIG. 4 depicts apparatus suitable for generating quadrature phased signals SC and SC', and quadrature phased auxiliary signals ASC and ASC'. A signal generator 410 provides a 3.58 MHz sinusoidal signal SC at a nominal 0° phase. This signal is phase shifted 90° by a network 412 to produce signal SC'. Signal ASC is derived from signal SC by means of a field phase control unit 414, which produces auxiliary signal ASC with a phase that reverses from field to field relative to the phase of a standard chrominance subcarrier. A 90° phase shifter 415 produces auxiliary signal ASC' in phase quadrature with auxiliary signal ASC.

Figure 5:
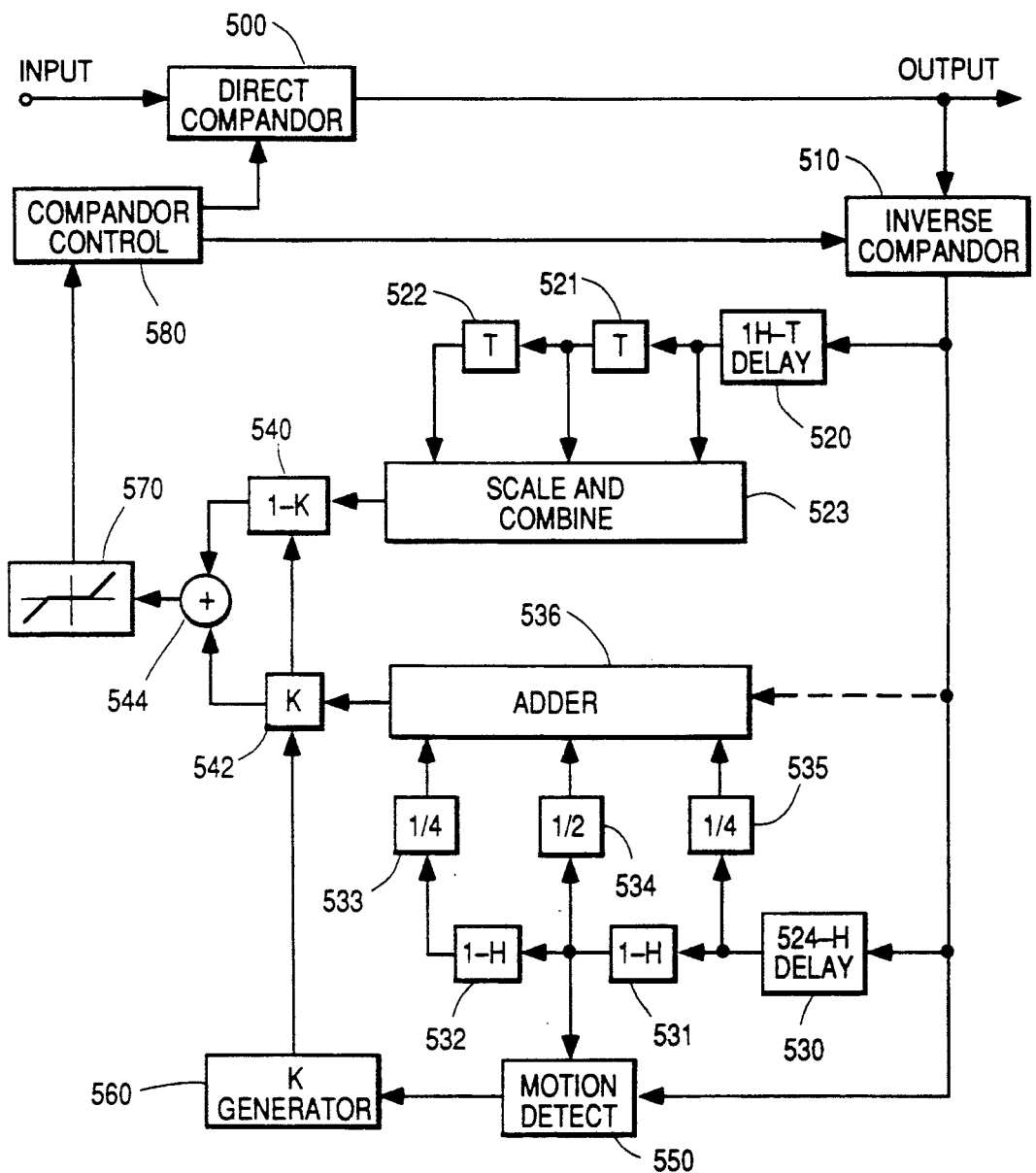
FIGS. 5 and 6 are block diagrams of video signal compansion (noise reduction) networks used in the arrangements of FIGS. 1 and 2 respectively.

FIG. 5 illustrates a video signal adaptive compander network suitable for use as noise reduction networks 38, 46 and 48 in FIG. 1.

Figure 7:
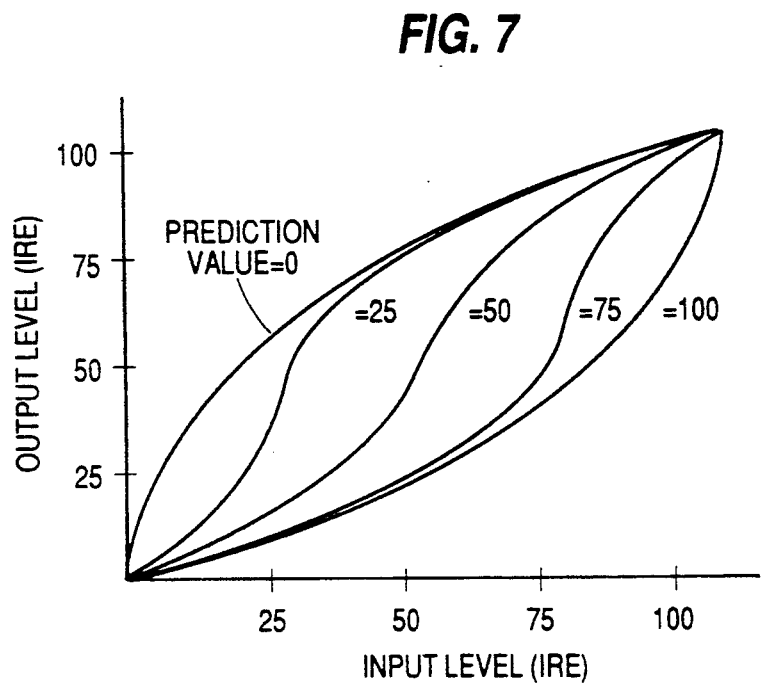
FIG. 7 illustrates a plurality of compander characteristics which may be implemented in an adaptive compander.

Typically compandors (at the transmitting end of a system) expand the amplitude of low amplitude signals and compress the amplitude of higher amplitude signals to improve the signal-to-noise ratio. Such a process enhances the quality of the lower level signals, but does little to improve higher level signals. On the other hand, if the relative amplitude of the signal to be processed is known, the signal-to-noise ratio of signals of almost any level can be improved by adaptive companding. This is accomplished by selecting a companding transfer characteristic which has its greatest slope located in the range of amplitudes in which signal samples are expected to occur. Consider the companding curves illustrated in FIG. 7, which are applicable for a compandor implemented in the transmitting end of a companding system. It will be appreciated that by changing the axis designation from Input and Output to Output and Input, the curves will correspond to the inverse or receiving end companding curves. If the amplitude of the input signal is expected to be between, e.g., 80 and 100 IRE, signals in this range will be expanded, and lesser amplitude signals will be compressed. Alternatively, if the signal is expected to be 50 IRE, signals in the range of about 50±10 IRE will be expanded and signals of greater and lesser amplitude will be compressed. A system which operates in this manner is an amplitude tracking companding system. The high correlation of video signals from line-to-line, field-to-field, or frame-to-frame permits the realization of such a tracking companding system.

In FIG. 5, video signal to be companded is applied to a multicharacteristic compandor 500 which provides a companded signal to be transmitted at the terminal OUTPUT. Compander 500 may be a ROM programmed with a plurality of tables of transfer characteristics, each table defining one companding characteristic such as those illustrated in FIG. 7. The selection of the particular table used at any given time is determined by a control signal developed by the compandor control circuit 580.

The companded signal is also coupled to inverse companding circuitry including elements 510-580 which emulates the expansion circuitry at the receiving end of the transmission system. An expanded signal from compandor 510 is applied to a first signal prediction circuit including elements 520-523 and to a second signal prediction circuit including elements 530-536.

The second prediction circuit includes the cascade arrangement of a delay element 530 which delays signal by substantially one video frame period minus one horizontal line period, and delay elements 531 and 532 each of which delay signals by one horizontal line period. Video signals from delay elements 530, 531 and 532 are coupled to signal weighting circuits 535, 534 and 533 respectively. Weighting circuits 535, 534 and 533 scale the signals applied thereto by factors ¼, ½ and ¼ respectively. Video signal from weighting circuits 533-535 are summed in an adder circuit 536 which generates a prediction signal temporally related to the current video signal. The temporal prediction signal from adder 536 is coupled to a variable weighting circuit 542 which scales the temporal prediction signal by a variable factor K provided by a control signal generator 560.

The temporal prediction signal may include contributions from the current image. This is indicated by the broken arrow connection between the output of compandor 510 and adder 536. This connection indicates that signal from one or more picture points of the current image frame may be weighted and combined with signals from the previous frame.

The first prediction circuit develops a prediction signal from signal from the current image field. In FIG. 5, output signal from compandor 510 is delayed by one horizontal line period minus time T in delay element 520. The time T is a short time period typically equal to one quarter of the period of the color subcarrier or a multiple thereof. The delayed signal is further delayed by cascade connected delay elements 521 and 522, each of which provides a delay of period T. Delayed signals from delay elements 520-522 are coupled to scaling and combining circuitry 523, which develops a spatial prediction signal. Scaling and combining circuitry 523 may be similar to elements 533-536 of the temporal prediction circuit. The spatial prediction signal provided by element 523 is coupled to a variable weighting circuit 540, which scales the spatial prediction signal by a variable factor (1-K) provided by control circuit 560.

For non-moving images, or areas of images which contain no interframe motion, the temporal average tends to be a more accurate prediction of the current signal. For moving images, or areas of images that contain interframe motion, the spatial average tends to be a more accurate prediction of the current signal. In order that the system perform well for both conditions of image motion and non-motion, the expanded signal from compandor 510 is monitored for motion to enable selection of the appropriate prediction signal.

A motion detector 550 is coupled between the input to delay element 530 and the output of delay element 531. Motion detector 550 provides a signal corresponding to interframe image signal differences. This difference signal is coupled to control signal generator 560 which generates variable control signals K for particular ranges of the difference signal. For image areas containing no motion, i.e., when the difference signal provided by motion detector 550 is zero, the control signal generator provides a K value of unity. In this instance weighting circuits 542 and 540 are respectively conditioned to pass the temporal prediction and to exclude the spatial prediction. When motion detector 550 generates a large amplitude difference signal, indicating significant image motion, generator 560 provides a value K of zero, which conditions weighting circuits 540 and 542 to pass the spatial prediction to the exclusion of the temporal prediction. For intermediate valued image difference signals, generator 560 develops values of K between zero and unity, which values of K condition weighting circuits 540 and 542 to pass the spatial and temporal prediction signals in complementary proportions.

The weighted spatial and temporal prediction signals from weighting circuits 540 and 542 are coupled to an adder 544 which provides a sum corresponding to the desired prediction signal. The prediction signal is coupled to compandor control circuit 580. Compandor control circuit 580 responds to the prediction signal from adder 544 for developing appropriate control signals to condition compandors 500 and 510 to operate according to a particular one of its selectable transfer characteristics.

Figure 6:
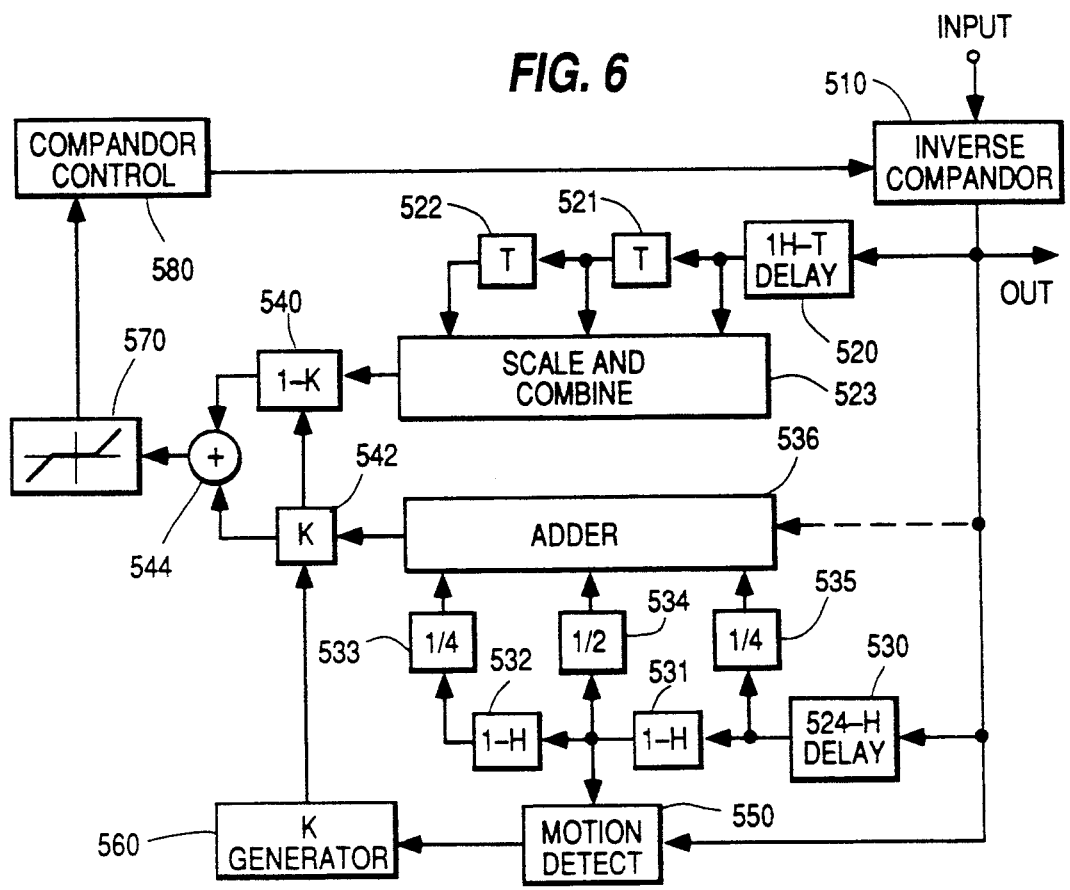

FIG. 6 illustrates companding circuitry for the receiving end of a system which incorporates the companding circuitry of FIG. 5 at the transmitting end. Elements designated with like numerals as elements in the FIG. 5 apparatus are similar and perform like functions. The apparatus of FIG. 6 is suitable for use as noise reduction networks 230, 246 and 258 in FIG. 2.

What is claimed is:

1. In a system for processing a widescreen television-type video signal containing main panel information, a first side panel component, and a second side panel component, apparatus comprising:
   means for combining said first and second side panel components to form a combined signal; and
   means, including noise reduction means, for processing said combined signal.

2. Apparatus according to claim 1, wherein
   said first side panel component is a luminance component; and
   said second side panel component is a chrominance component.

3. Apparatus according to claim 2, wherein
   said first side panel component is a high frequency luminance component exclusive of D.C. information; and
   said second side panel component is a color difference component.

4. Apparatus according to claim 3, wherein said processing means further includes
   means for time translating said combined signal;
   means for filtering said combined signal; and
   means for modulating an auxiliary subcarrier with a processed combined signal from said processing means.

5. In a system for receiving a widescreen television-type video signal containing main panel information, a first side panel component combined with a second side panel component as a combined side panel signal, apparatus comprising means, including noise reduction means, for processing said combined side panel signal;
   means for separating said combined side panel signal into its constituent first and second side panel components; and
   means for combining said separated side panel components with said main panel information to produce a widescreen image representative signal.

6. Apparatus according to claim 5, wherein
   said first and second side panel components are luminance and chrominance components respectively; and
   said noise reduction means exhibits a nonlinear operating characteristic.

7. Apparatus according to claim 6, wherein
   said first side panel component is a high frequency luminance component exclusive of D.C. information; and
   said second side panel component is a color difference component.

8. Apparatus according to claim 7, wherein said processing means further includes
   means for time translating said combined signal.

9. In a system for processing a widescreen television-type video signal containing a main panel component, a high frequency first side panel component, a low frequency second side panel component and a third side panel component, apparatus comprising:
   means for processing said second side panel component;
   means for combining said first and third side panel components to form a combined side panel signal; and
   means, including noise reduction means, for processing said combined side panel signal.

10. Apparatus according to claim 9, wherein
    said first and second side panel components contain luminance information and said third side panel component contains chrominance information.

11. In a system for receiving a widescreen television-type video signal containing a main panel component, a high frequency first side panel component combined with a third side panel component as a combined side panel signal, and a low frequency second side panel component, apparatus comprising
    first means for processing said second side panel component;
    second means, including noise reduction means, for processing said combined side panel signal;
    means for separating said combined side panel signal into its constituent first and third side panel components; and
    means for combining said separated side panel components with said processed second side panel component and said main panel component to produce a widescreen image representative signal.

12. Apparatus according to claim 11, wherein
    said noise reduction means exhibits a nonlinear operating characteristic.

13. Apparatus according to claim 11, wherein
    said first and second side panel components contain luminance information, and said third side panel component contains chrominance information.

* * * * *